March 21, 1933.  G. Q. LEWIS  1,902,651
BUMPER
Filed June 22, 1931
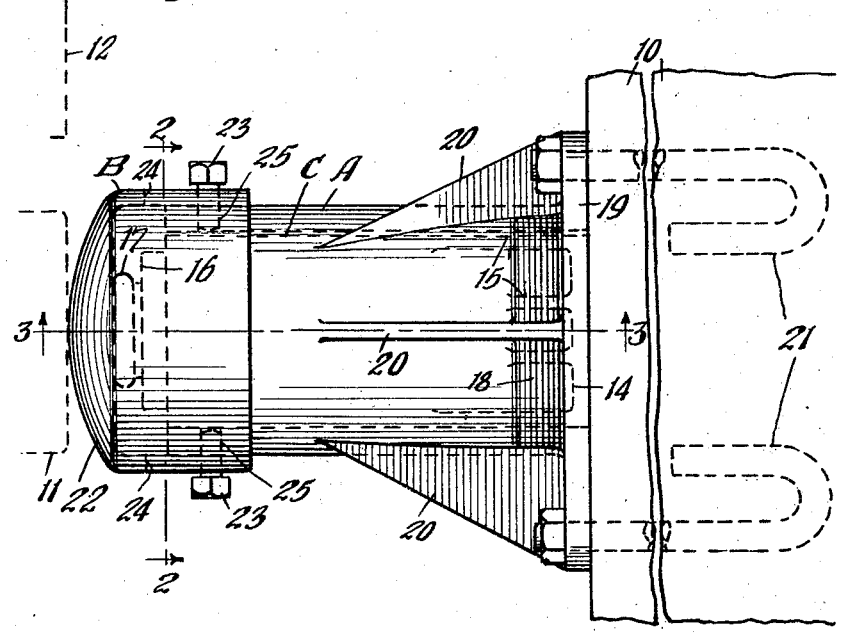
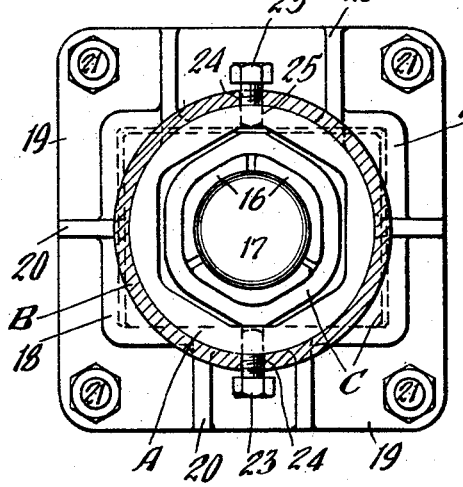
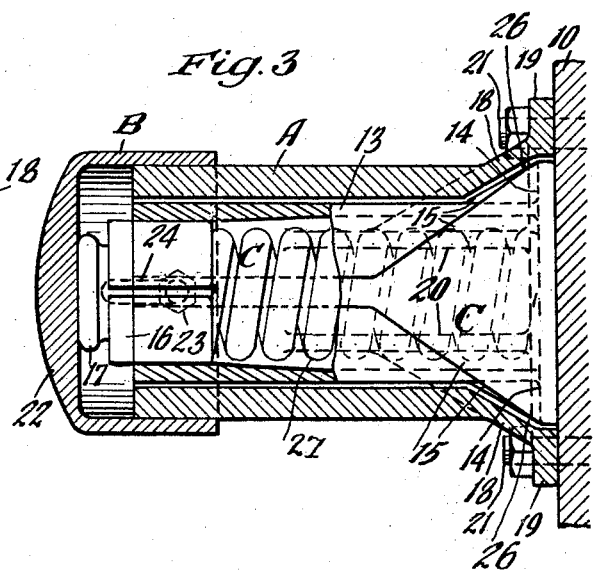
Inventor
Goodrich Q. Lewis
Witness
Wm. Geiger
By Henry Fuchs, Atty.

Patented Mar. 21, 1933

1,902,651

UNITED STATES PATENT OFFICE

GOODRICH Q. LEWIS, OF WHEATON, ILLINOIS, ASSIGNOR TO W. H. MINER, INC., OF CHICAGO, ILLINOIS, A CORPORATION OF DELAWARE

BUMPER

Application filed June 22, 1931. Serial No. 546,014.

This invention relates to improvements in bumpers.

One object of the invention is to provide a shock absorbing bumper of rugged design, which may be readily attached to various types of terminal bumping posts used in railway practice, wherein the shock absorbing bumper includes a casing enclosing a complete friction shock absorbing mechanism, and the casing when attached to the post confines the shock absorbing mechanism therewithin so as to prevent unauthorized detachment and removal of the same.

A further object of the invention is to provide a bumper as specified in the preceding paragraph, including a buffing cap closing the open end of the casing and movable lengthwise of the same to transmit the blows to the friction shock absorbing mechanism, wherein the friction shock absorbing mechanism is so arranged as to function properly to receive and cushion blows in the event that the buffing cap becomes detached from the casing.

A more specific object of the invention is to provide a terminal bumper comprising a casing secured to the usual bumping post, a friction shock absorbing mechanism disposed within the casing, and a movable buffing cap telescoped over the outer end of the casing, wherein the friction shock absorbing mechanism includes the usual spring resisted friction means disposed within a friction shell and the friction shell is of such a length that the outer end thereof is flush with the outer end of the enclosing casing, whereby both the casing and the shell act jointly as solid column load-transmitting means to take the blow when the friction shock absorbing mechanism is fully compressed.

Other objects of the invention will more clearly appear from the description and claims hereinafter following.

In the drawing, forming a part of this specification, Figure 1 is a side elevational view of a terminal bumping post, illustrating my improvement in connection therewith, the post being shown broken away, and the coupler head and platform end of a railway car being indicated in dotted lines in said figure. Figure 2 is a vertical sectional view, corresponding substantially to the line 2—2 of Figure 1. And Figure 3 is a longitudinal, horizontal sectional view, corresponding substantially to the line 3—3 of Figure 1.

In said drawing, 10 indicates a terminal bumper post employed at the end of a railway track. The outer portion of the coupler head 11 of a railway car is indicated in dotted lines in Figure 1, and the platform of the car, designated by 12 and indicated in dotted lines, is shown above the coupler.

My improved terminal bumper comprises broadly a casing A, a buffing cap B, and a friction shock absorbing mechanism C, of the friction shell type.

The friction shock absorbing mechanism employed may be of any well-known form. As herein shown, the same comprises a friction shell 13 open at the forward end and having laterally projecting flanges 14—14 at the rear end. The shell is closed at the rear by a transverse wall which is continuous with the flanges 14—14 and forms the usual integral rear follower of the shell. The flanges 14—14 are suitably reinforced by webs 15—15 formed integral therewith and the side walls of the shell. The usual friction means cooperates with the shell and comprises friction shoes 16—16 and a block 17 having wedging engagement with the shoes. Inward movement of the friction means is resisted by the usual spring 27, which is contained within the shell and cooperates with the shoes 16—16.

The casing A is in the form of a tubular member open at the front and rear ends. The interior of the casing is preferably of substantially hexagonal cross-section so as to correspond to the cross-sectional outline of the friction shell, which in this case is of hexagonal form. At the inner end, the side walls of the casing A are flared outwardly, as indicated at 18. Interiorly of the casing, the flaring sections of the side walls provide inclined transverse abutment surfaces 26—26 with which the inclined webs 15—15 of the friction shell engage to limit outward movement of the shell. Securing flanges 19—19 are provided at the rear end of the shell, said flanges being reinforced by webs 20—20. The shell is secured to the post 10 by means of anchoring bolts 21—21, which are rigidly attached to the post and extend through the flanges 19—19 of the casing A. Nuts threaded on the outer ends of the bolts 21—21 serve to fix the casing to the post. The casing A is of substantially the same length as the friction shell 13 of the friction shock absorbing mechanism C so that the outer end of the casing and shell are flush, as clearly shown in Figure 3.

The buffing cap B is telescoped over the open end of the friction shell A and has a relatively heavy, vertical outer wall 22, which is thickened centrally, as clearly illustrated in Figure 3, and has an outer rounded surface of spherical form. The inner surface of the wall 22 is substantially flat and engages the front end of the wedge block 17. The cap B is slidingly fixed to the casing A by means of cap screws 23—23 extending through slots 24—24 in the side wall of the cap B and threaded into openings 25—25 provided at diametrically opposite ends of the casing A.

The rear end of the friction shell 13 of the shock absorbing mechanism C bears directly on the front face of the post 10 and is held against outward movement by means of the webs 15—15, which have shouldered engagement with the abutment faces 26—26 of the side walls of the casing A.

In assembling the parts of my improved bumper, the friction casing with the spring and friction means assembled therewith is inserted through the open rear end of the casing A. The buffing cap B may be attached to the casing A either before or after the friction shock absorbing mechanism is placed within the same. After the parts have been thus assembled, the casing A is secured to the terminal post 10 by means of the bolts 21—21. As will be evident, the friction shock absorbing mechanism is thus locked against removal within the casing A, the rear end of the shell 13 bearing on the bumping post and the webs 15—15 engaging the walls 26—26 of the casing.

In case the buffing cap B accidentally becomes detached from the casing A or is removed by a person not authorized to do so, the friction shock absorbing mechanism cannot be withdrawn from the casing, and the entire device will still function to properly cushion blows. This is assured by the friction shock absorbing mechanism being so arranged that the wedge projects outwardly of the shell 13 and casing A.

In absorbing blows, the buffing cap is moved inwardly of the casing A by the coupler or other part of the car engaging the buffing cap. Upon rearward movement of the cap B, as shown in Figures 1 and 3, the friction shock absorbing mechanism will be compressed by forcing the wedge and friction shoes inwardly of the friction shell. When the force acting on the cap B is reduced, the spring of the friction shock absorbing mechanism will return the friction shoes and wedge, and the wedge in turn will restore the buffing cap to its normal position. As will be evident, outward movement of the buffing cap B is limited by engagement of the inner end walls of the slots 24—24 with the cap screws 23—23. Inward movement of the buffing cap B is limited by engagement with the outer ends of the friction shell 13 and casing A, these two members thus jointly acting as a solid column to transmit the load to the post 10 and relieve the spring of the friction shock absorbing mechanism from undue compression.

I have herein shown and described what I now consider the preferred manner of carrying out my invention, but the same is merely illustrative and I contemplate all changes and modifications that come within the scope of the claims appended hereto.

I claim:

1. In a bumper including a supporting post, the combination with a casing fixed to said post, said casing being open at the forward end; of a buffing cap closing the open end of the casing and movable lengthwise of the same; and a removable friction shock absorbing mechanism housed within the casing, said friction shock absorbing mechanism including a friction shell and cooperating spring resisted friction means movable lengthwise of the shell, said friction means being engaged and actuated by the buffing cap and said shell being held against movement outwardly and inwardly of the casing.

2. In a bumper including a supporting post, the combination with a casing fixed to said post, said casing being open at the front and rear ends; of a buffing cap closing the open front end of the casing and movable lengthwise of the same; and a friction shock absorbing mechanism housed within the casing, said mechanism including a friction shell and cooperating spring resisted friction means movable lengthwise of the shell, said shell abutting the post and the friction means of said mechanism being engaged and actuated by the buffing cap.

3. In a bumper including a supporting post, the combination with a casing fixed to said post, said casing being open at the forward end; of a buffing cap closing the open end of the casing and movable lengthwise of the same; a friction shock absorbing mechanism housed within the casing, said friction shock absorbing mechanism including a friction shell and cooperating spring resisted friction means movable lengthwise of the shell, said friction means being engaged and actuated by the buffing cap, said friction shell being held against movement inwardly of the casing and having the front end thereof flush with the front end of the casing, whereby movement of the buffing cap toward the casing is limited by simultaneous engagement thereof with the outer ends of both the casing and friction shell.

4. In a bumper including a supporting post, the combination with a casing fixed to said post, said casing being open at the front and rear ends; of a buffing cap closing the open front end of the casing and movable lengthwise of the same; and a friction shock absorbing mechanism housed within the casing, said mechanism including a friction shell and cooperating spring resisted friction means movable lengthwise of the shell, said shell abutting the post, and the friction means of said mechanism being engaged and actuated by the buffing cap, said friction shell also having engagement with the casing to hold the shell against outward movement.

5. In a bumper including a supporting post, the combination with a casing fixed to said post, said casing being open at the forward end; of a buffing cap closing the open end of the casing and movable lengthwise of the same; a friction shock absorbing mechanism housed within the casing, said friction shock absorbing mechanism including a friction shell and cooperating spring resisted friction means movable lengthwise of the shell, said friction means being engaged and actuated by the buffing cap, said friction shell being held against movement inwardly of the casing; and means for preventing removal of the shell including interengaging locking shoulders on said shell and casing.

In witness that I claim the foregoing I have hereunto subscribed my name this 19th day of June, 1931.

GOODRICH Q. LEWIS.